United States Patent
Jatzke et al.

(10) Patent No.: US 7,997,437 B2
(45) Date of Patent: Aug. 16, 2011

(54) BODY FILLER PLUG

(75) Inventors: Stefan Jatzke, Ebertsheim (DE); Herbert Beumann, Helmstedt (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 1529 days.

(21) Appl. No.: 10/550,817

(22) PCT Filed: Mar. 24, 2004

(86) PCT No.: PCT/EP2004/003123
§ 371 (c)(1), (2), (4) Date: Sep. 23, 2005

(87) PCT Pub. No.: WO2004/085231
PCT Pub. Date: Oct. 7, 2004

(65) Prior Publication Data
US 2006/0186130 A1 Aug. 24, 2006

(30) Foreign Application Priority Data
Mar. 27, 2003 (DE) .............. 203 04 994 U

(51) Int. Cl.
*B65D 41/00* (2006.01)
*B65D 55/00* (2006.01)
*B65D 39/00* (2006.01)
(52) U.S. Cl. ............ 220/359.4; 220/201; 220/789
(58) Field of Classification Search ......... 220/359.1, 220/359.4, 789, 201
See application file for complete search history.

(56) References Cited

U.S. PATENT DOCUMENTS

| | | | | |
|---|---|---|---|---|
| 3,851,794 | A | * | 12/1974 | Hehl .............. 220/789 |
| 4,290,536 | A | * | 9/1981 | Morel .............. 220/789 |
| 4,363,420 | A | | 12/1982 | Andrews |
| 4,588,105 | A | * | 5/1986 | Schmitz et al. ...... 220/787 |
| 5,071,022 | A | * | 12/1991 | Sick .............. 220/789 |
| 5,254,250 | A | | 10/1993 | Rolchigo et al. |
| 5,852,854 | A | | 12/1998 | Pierrot et al. |
| 6,170,691 | B1 | * | 1/2001 | Morris et al. ........ 220/304 |

FOREIGN PATENT DOCUMENTS

DE 31 00 498 A1 1/1982
DE 31 42 850 A1 5/1983
(Continued)

OTHER PUBLICATIONS

Machine translation of EP 0 631 923 A1, provided by Yahoo! Babel Fish. http://babelfish.yahoo.com/, Jun. 2009.*
Information Report Document evidencing date of disclosure (Jun. 7, 2002) of drawing 7HO 810 903, Dec. 18, 2006.
(Continued)

*Primary Examiner* — Anthony Stashick
*Assistant Examiner* — James N Smalley
(74) *Attorney, Agent, or Firm* — Tarolli, Sundheim, Covell & Tummino LLP

(57) ABSTRACT

A plug (10) for sealing holes in a vehicle body comprises a central closure section (12) and engaging section (14) arranged on the rim and provided for receiving portions of the vehicle body. The closure section (12) and the engaging section (14) are made of a plastics material and the plastics material of the engaging section (14) is softer than the plastics material of the closure section (12). The plastics material of the engaging section (14) can be softened by heating such that a tight connection is produced between the engaging section (14) and the portions of the vehicle body that are received by it.

20 Claims, 1 Drawing Sheet

FOREIGN PATENT DOCUMENTS

| | | |
|---|---|---|
| DE | 3142850 | 11/1983 |
| DE | 3427626 | 10/1985 |
| EP | 0631923 | 3/1994 |
| EP | 0 631 923 A1 | 1/1995 |
| EP | 1375308 | 1/2004 |
| GB | 1466563 | 3/1977 |
| JP | 2 293 278 A | 12/1990 |
| JP | 771602 | 6/1994 |

OTHER PUBLICATIONS

Two sheets Volkgwagen AG corres to an order for tools, Jun. 26, 2002.
7H0 810 903 drawing, Feb. 19, 2003.
7H0 810 903 drawing with handwritten comments, Feb. 19, 2003.
Enlarged drawing 7H0 810 903 with handwritten indications, Feb. 19, 2003.

* cited by examiner

BODY FILLER PLUG

FIELD OF THE INVENTION

The present invention relates to a plug for sealing holes in a vehicle body, comprising a central closure section and an engaging section arranged on the rim and provided for receiving portions of the vehicle body.

BACKGROUND OF THE INVENTION

Vehicle body plugs of this type are commonly known. The plugs are meant to protect holes, which are provided in the vehicle body and are required for manufacturing the vehicle body, against humidity and corrosion. The known plugs, however, do not allow a permanent and full sealing of the holes.

SUMMARY OF THE INVENTION

In comparison with this, the invention provides a vehicle body plug which can be produced at low cost, is easy to install and makes possible a full sealing of the sheet metal edges also with differing plate thicknesses and various collar heights of the hole. Moreover, the vehicle body plug according to the invention can be applied prior to painting of the vehicle body as well as after it.

According to the invention, to this end a plug is provided for sealing holes in a vehicle body, which comprises a central closure section and an engaging section arranged on the rim and provided for receiving portions of the vehicle body, in which the closure section and the engaging section are made of a plastics material and the plastics material of the engaging section is softer than the plastics material of the closure section, and the plastics material of the engaging section being adapted to be softened by heating such that a tight connection is produced between the engaging section and the portions of the vehicle body that are received by it.

Advantageous further developments of the invention will be apparent from the subordinate claims.

Preferably, the vehicle body plug according to the invention is mounted to a vehicle body which is provided with a priming paint and subsequently will be provided with a painting and transported through a paint drying plant. It is by means of the temperature prevailing in the paint drying plant that the plug seals the hole on two sides due to the softening and, preferably, as well as due to the flowing of the soft engaging section around the edges of the hole. In the case of an application after the painting, the contact pressure exerted by the closure section on both sides on the sealing lips provided in the engaging section ensures a reliable sealing, without the engaging section being melted onto the sheet metal.

Thus, the invention guarantees a full and permanent sealing of the sheet metal edges of holes in the vehicle body, and with this a protection against corrosion.

BRIEF DESCRIPTION OF THE DRAWINGS

Further advantages of the invention will be apparent from the following description of a preferred embodiment in conjunction with the attached drawings in which.

DESCRIPTION OF EXAMPLE EMBODIMENTS

Figure 1:
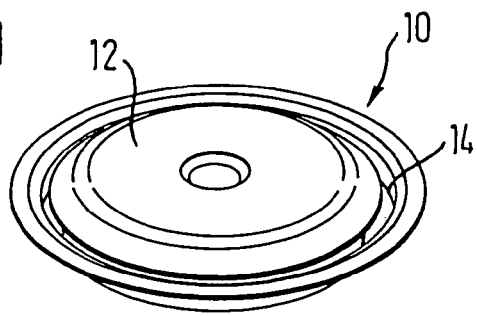
FIG. 1 is a perspective view of a vehicle body plug according to the invention.
Figure 2:
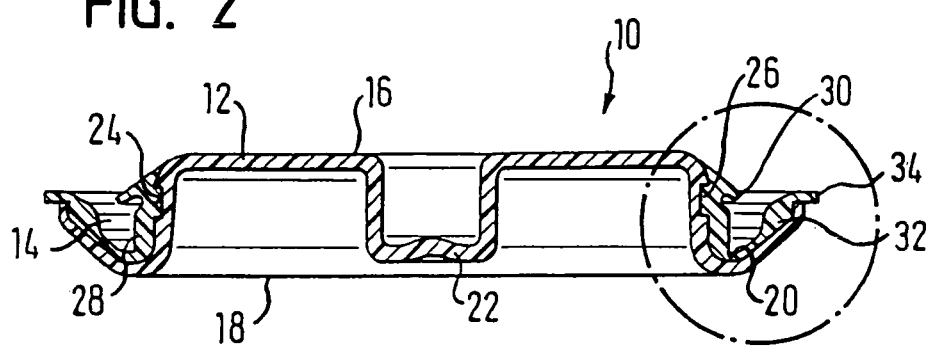
FIG. 2 is a sectional view through the body plug according to the invention of FIG. 1.
Figure 3:
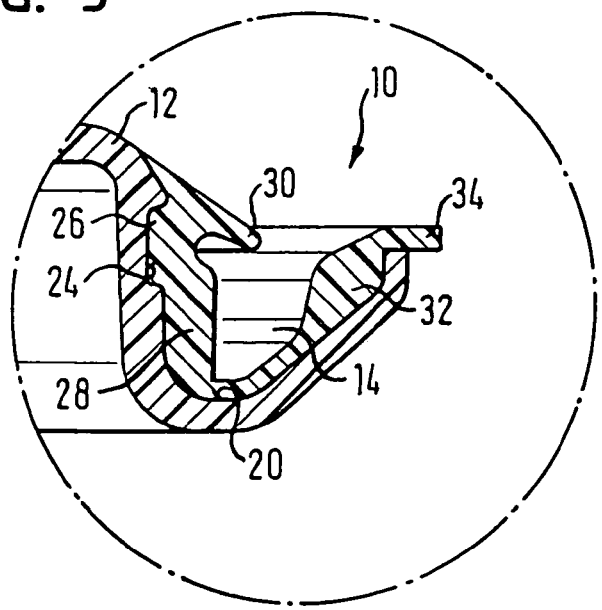
FIG. 3 shows a detail of FIG. 2.

The plug 10 shown in the Figures has a central closure section 12 and an engaging section 14 arranged on the rim and provided for receiving portions of the vehicle body, for instance the edges of holes or collars in the sheet metal.

The closure section 12 which here is essentially hollow cylindrical in shape, consists of a relatively hard plastics material, for instance a polyester ester elastomer having a hardness in the range of about 55 Shore D (e.g. Arnitel, available from DSM, The Netherlands). One end 16 of the hollow cylindrical closure section 12 is closed by the formation of a bottom. The opposite end 18 is open and bent outwards toward the closed end 16, forming a deepening 20 in the region of the rim. On the bottom of the closure section 12, there is preferably formed a centrally arranged protrusion 22 directed into the hollow cylinder, this protrusion improving the mechanical strength and the ability of mounting the plug.

The engaging section 14 inserted in the deepening 20 in the region of the rim has an essentially U- or V-shaped cross section with two opposite side walls 28, 32 and is made of a plastics material which is softer than the plastics material of the closure section 12. A thermoplastic rubber having a hardness in the order of about 85 Shore A (e.g. Santoprene, available from Advanced Elastomer Systems, Belgium) can be for used, for example, for the plastics material of the engaging section 14. The plastics material of the engaging section 14 preferably has a melting temperature of between about 150 and 200° C. This guarantees that, with the temperatures prevailing in usual paint drying plants, the plastics material will melt up in the region of the sheet metal edges received in the engaging section, thereby achieving a reliable sealing of the vehicle body holes.

In this case, the engaging section 14 is produced in the form of a separate insert piece and is inserted in the deepening 20 in the region of the rim of the closure section 12. The hollow cylindrical closure section 12 has a surrounding recess 24 on its outer surface; a corresponding protrusion 26 on the engaging section 14 engages in this recess. With this, there is produced a connection between the engaging section 14 and the closure section 12 in the form of an interlocking fit. However, the engaging section can also be bonded to the closure section 12 by gluing. Further, it is possible to mold the engaging section 14 integrally with the closure section 12 in an injection-molding tool, whereby a firm adhesive connection can be achieved, too.

On its side wall 28 lying against the closure section 12, the engaging section 14 further has a surrounding, laterally protruding sealing lip 30 which after installation of the plug 10 in the vehicle body hole forms a latching connection with the edge of the hole in the sheet metal. The side wall 32 lying opposite the first side wall 28 of the engaging section 14 reaches beyond the rim of the closure section 12 and therefore forms a further sealing lip 34 which in use engages the opposite side of the edge of the hole in the sheet metal. In so doing, the closure section 12 produces a resiliently elastic pressure and, hence, presses the sealing lips 30, 34 from opposite sides against the sheet metal edges of the hole in the vehicle body. In this way a reliable sealing will be guaranteed even when the vehicle body plug 10 is mounted after painting of the vehicle body, with no melting up of the engaging section 14 in the region of the edge of the hole in the sheet metal occurring.

For application of the vehicle body plug 10 according to the invention, the plug is installed in the holes of a vehicle body provided with a priming paint. The vehicle body will subsequently be painted and transported through a paint drying plant. It is by the high temperature prevailing in the paint drying plant and the contact pressure of the hard closure section 12 that the engaging section 14, consisting of a soft plastics material, is pressed against the edge of the hole in the sheet metal from both sides and melts up in this region. The hole in the vehicle body is reliably sealed thereby; at the same time, uneven portions in the sheet metal can be leveled out to a certain extent. After cooling down of the painted vehicle body and the plug 10, and after solidification of the soft plastics material associated therewith, the edges of the hole in the sheet metal will be fully and permanently sealed. Owing to this kind of sealing, the vehicle body plug can also be used with various collar heights on a hole in the sheet metal, as well as with different plate thicknesses. In this case, too, a permanent protection against humidity and corrosion is ensured.

If the plug 10 is applied after the painting of the vehicle body and without any heating occurring, the sealing of the edges of the hole in the sheet metal will be achieved solely by the contact pressure exerted on the soft engaging section 14 by the hard closure section 12. Thus, the invention allows a double sided sealing of the edges of the hole in the sheet metal of a vehicle body both prior to painting and after painting.

The invention claimed is:

1. A plug (10) for sealing holes in a vehicle body, comprising a central closure section (12) and an engaging section (14) arranged on the rim and provided for receiving portions of the vehicle body, the closure section (12) being formed so as to have a hollow cylindrical shape with a closed axial end (16) and an open axial end (18), the engaging section (14) being positioned entirely between the closed end (16) and the open end (18), the closure section (12) and the engaging section (14) being made of a plastics material and the plastics material of the engaging section (14) being softer than the plastics material of the closure section (12), and the plastics material of the engaging section (14) being adapted to be softened by heating such that a tight connection is produced between the engaging section (14) and the portions of the vehicle body that are received by it, the engaging section having a surrounding sealing lip (30), which forms a latching connection with an edge of the hole in the vehicle body, and a further sealing lip (34), which engages the opposite side of the edge of the hole in the vehicle body, characterized in that the engaging section (14) is inserted in a deepening (20) on the rim side of the closure section (12).

2. The plug according to claim 1, wherein the closure section (12) and the engaging section (14) are connected with each other by an interlocking fit.

3. The plug according to claim 1, wherein the closure section (12) and the engaging section (14) are bonded to each other by gluing.

4. The plug according to claim 1, wherein the softening of the engaging section (14) is performed at a temperature of between 150 and 200° C.

5. The plug according to claim 1, wherein the closure section (12) presses the engaging section (14) against the vehicle body portions in a resilient and elastic fashion.

6. The plug according to claim 1, wherein the open end (18) is bent outwards toward the closed end (16), forming the deepening (20) on the rim side.

7. The plug according to claim 6, wherein the hollow cylindrical closure section (12) has a surrounding recess (24) on its outer surface, the engaging section (14) engaging in the recess (24) to form an interlocking fit.

8. A plug (10) for sealing holes in a vehicle body, comprising a central closure section (12) and an engaging section (14) arranged on the rim and provided for receiving portions of the vehicle body, the closure section (12) and the engaging section (14) being made of a plastics material and the plastics material of the engaging section (14) being softer than the plastics material of the closure section (12), and the plastics material of the engaging section (14) being adapted to be softened by heating such that a tight connection is produced between the engaging section (14) and the portions of the vehicle body that are received by it, the engaging section having a surrounding sealing lip (30), which forms a latching connection with an edge of the hole in the vehicle body, and a further sealing lip (34), which engages the opposite side of the edge of the hole in the vehicle body, characterized in that the engaging section (14) is inserted in a deepening (20) on the rim side of the closure section (12), the closure section (12) being formed so as to have a hollow cylindrical shape with a closed axial end (16) and an open axial end (18), the open end (18) being bent outwards toward the closed end (16), forming the deepening (20) on the rim side, the engaging section (14) being positioned entirely between the closed end (16) and the open end (18) of the closure section (12), wherein the engaging section (14) has two side surfaces (28, 32) located opposite each other, the first side surface (28) lying against the outer surface of the hollow cylindrical closure section (12) and the second, opposite side surface (32) reaching beyond the rim of the closure section (12).

9. The plug according to claim 1, wherein the deepening (20) has a U-shaped cross-section, the engaging section (14) engaging only the deepening (20) of the closure section (12).

10. The plug according to claim 1, wherein the open end (18) is free of the engaging section (14) when the engaging section (14) is inserted into the deepening (20).

11. The plug according to claim 1, wherein the sealing lip (30) extends radially outward.

12. The plug according to claim 1, wherein the engaging section has a U-shaped cross section.

13. The plug according to claim 1, wherein the hole extends through oppositely facing first and second surfaces of the vehicle body, the surrounding sealing lip (30) engaging the first surface and the further sealing lip (34) engaging the second surface when the plug is connected with the vehicle body.

14. The plug according to claim 1, wherein the surrounding sealing lip (30) is radially spaced from the further sealing lip (24).

15. The plug according to claim 1, wherein the surround sealing lip (30) is axially spaced from the further sealing lip (24) when the plug is connected with the vehicle body.

16. The plug according to claim 8, wherein the sealing lip (30) extends radially outward.

17. The plug according to claim 8, wherein the engaging section has a U-shaped cross section.

18. The plug according to claim 8, wherein the hole extends through oppositely facing first and second surfaces of the vehicle body, the surrounding sealing lip (30) engaging the first surface and the further sealing lip (34) engaging the second surface when the plug is connected with the vehicle body.

19. The plug according to claim 8, wherein the surrounding sealing lip (30) is radially spaced from the further sealing lip (24).

20. The plug according to claim 8, wherein the surround sealing lip (30) is axially spaced from the further sealing lip (24) when the plug is connected with the vehicle body.

* * * * *